United States Patent
Nomura et al.

(10) Patent No.: US 7,517,830 B2
(45) Date of Patent: Apr. 14, 2009

(54) SUBSTRATE FOR EXHAUST-GAS PURIFYING FILTER CATALYST

(75) Inventors: Kumiko Nomura, Okazaki (JP); Satoko Inuduka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 708 days.

(21) Appl. No.: 10/545,814

(22) PCT Filed: Feb. 13, 2004

(86) PCT No.: PCT/JP2004/001605

§ 371 (c)(1),
(2), (4) Date: Aug. 16, 2005

(87) PCT Pub. No.: WO2004/073858

PCT Pub. Date: Sep. 2, 2004

(65) Prior Publication Data

US 2006/0154817 A1    Jul. 13, 2006

(30) Foreign Application Priority Data

Feb. 18, 2003    (JP)    ............... 2003-039645

(51) Int. Cl.
- *B01J 23/02* (2006.01)
- *B01J 23/10* (2006.01)
- *B01J 23/38* (2006.01)
- *B01J 32/00* (2006.01)
- *B01J 35/04* (2006.01)

(52) U.S. Cl. ............... 502/302; 502/340; 502/344; 502/439; 502/527.24

(58) Field of Classification Search .......... 502/302, 502/340, 344, 439, 527.24
See application file for complete search history.

(56) References Cited

U.S. PATENT DOCUMENTS

| | | | |
|---|---|---|---|
| 7,250,384 B2 * | 7/2007 | Morimoto et al. | 501/119 |
| 2002/0198104 A1 | 12/2002 | Nishimura et al. | |
| 2004/0152593 A1 * | 8/2004 | Cutler et al. | 502/439 |
| 2005/0159308 A1 * | 7/2005 | Bliss et al. | 502/439 |
| 2005/0272602 A1 * | 12/2005 | Ninomiya | 502/439 |
| 2006/0166820 A1 * | 7/2006 | Ogyu et al. | 502/439 |
| 2007/0054803 A1 * | 3/2007 | Miyairi | 502/439 |
| 2008/0125316 A1 * | 5/2008 | Noda et al. | 502/439 |

FOREIGN PATENT DOCUMENTS

| | | |
|---|---|---|
| CN | 1363010 A | 8/2002 |
| EP | 0 753 490 A1 | 1/1997 |
| EP | 1 298 112 A1 | 4/2003 |
| JP | A 6-159037 | 6/1994 |
| JP | A-9-77573 | 3/1997 |

(Continued)

*Primary Examiner*—Timothy C Vanoy
(74) *Attorney, Agent, or Firm*—Oliff & Berridge, PLC

(57) ABSTRACT

In the distribution of surface vacancies which open on the surface of the cellular walls of pores, more than 8% of total opening area of all surface vacancies that the pores are open on the surface of the cellular walls is occupied by total opening area of surface vacancies having maximum diameter of from 10 to 50 μm, in the distribution of inner pores, more than 20% of total cross-sectional area of all pores is occupied by total cross-sectional area of pores having cross-sectional area equivalent to that of a circle having diameter more than 300 μm.

17 Claims, 11 Drawing Sheets

FOREIGN PATENT DOCUMENTS

| | | |
|---|---|---|
| JP | A 9-173866 | 7/1997 |
| JP | A 9-220423 | 8/1997 |
| JP | A 2002-121084 | 4/2002 |
| JP | A 2002-143615 | 5/2002 |
| JP | A 2002-274947 | 9/2002 |
| JP | A-2002-349234 | 12/2002 |
| JP | A-2003-40678 | 2/2003 |
| WO | WO 01/61159 A1 | 8/2001 |
| WO | WO 01/91882 A1 | 12/2001 |

* cited by examiner

Surface Vacancy Rate of from 10 to 50 μm(%)

Surface Vacancy Rate of from 50 to100 μm(%)

Surface Vacancy Rate of from 100 to 200 μm(%)

Surface Vacancy Rate of more than 200 μm(%)

SUBSTRATE FOR EXHAUST-GAS PURIFYING FILTER CATALYST

FIELD OF THE INVENTION

The present invention relates to a honeycomb-shaped substrate used for an exhaust-gas purifying filter catalyst which purifies exhaust gases, such as those emitted from diesel engines which includes particulates.

BACKGROUND OF THE INVENTION

Regarding gasoline engines, harmful components in the exhaust gases have been reduced securely by the strict regulations on the exhaust gases and the technological developments capable of coping with the strict regulations. However, regarding diesel engines, the regulations and the technological developments have been advanced less compared to those of gasoline engines due to the unique circumstances that the harmful components are emitted as particulates (i.e., particulate materials, such as carbonaceous fine particles, sulfuric fine particles like sulfates, and high-molecular weight hydrocarbon fine particles, hereinafter collectively referred to as "PMs.")

As exhaust-gas purifying apparatuses having been developed so far for diesel engines, the following have been known. For example, the exhaust-gas purifying apparatuses can be roughly divided into trapping (or wall-flow) exhaust-gas purifying apparatuses and open (or straight-flow) exhaust-gas purifying apparatuses. Among these, clogged honeycomb structures made from ceramic (i.e., diesel PMs filters, hereinafter referred to as "DPFs") have been known as one of the trapping exhaust-gas purifying apparatuses. In the DPFs, the honeycomb structures are clogged at the opposite openings of cells in a checkered manner alternately, for instance. The DPFs comprise inlet cells clogged on the downstream side of exhaust gases, outlet cells neighboring the inlet cells and clogged on the upstream side of the exhaust gases, and filter cellular walls demarcating the inlet cells and the outlet cells. In the DPFs, the exhaust gases are filtered by the pores of the filter cellular walls to collect PMs.

In the DPFs, however, the pressure loss increases as PMs deposit thereon. Accordingly, it is needed to regularly remove deposited PMs to recover the DPFs by certain means. Hence, when the pressure loss increases, deposited PMs have been burned with burners or electric heaters conventionally, thereby recovering the DPFs. However, in this case, the greater the deposition of PMs is, the higher the temperature increases in burning deposited PMs. Consequently, there might arise cases that the DPFs are damaged by thermal stress resulting from such burning.

Hence, continuously regenerative DPFs (an exhaust-gas purifying filter catalyst) have been developed recently. In the continuously regenerative DPFs, a coating layer comprising alumina is formed on the surface of the cellular walls of the DPFs, and a catalytic ingredient such as platinum (Pt) is loaded on the coating layer. In accordance with the continuously regenerative DPFs, since the collected PMs are oxidized and burned by the catalytic reaction of the catalytic ingredient, it is possible to regenerate the DPFs by burning PMs simultaneously with or successively after collecting PMs. Moreover, since the catalytic reaction occurs at relatively low temperatures, and since PMs can be burned when they are collected less, the continuously regenerative DPFs produce an advantage that the thermal stress acting onto the DPFs is so less that the DPFs are inhibited from being damaged.

As this type of exhaust-gas purifying filter catalyst, for example, Japanese Unexamined Patent Publication (KOKAI) No. 09-173866 discloses an exhaust-gas purifying filter catalyst which comprises on the surface of the cellular walls, forming a cellular coating layer comprising activated alumina whose particle diameter is larger than the average pore diameter, on the inside of the pores, coating activated alumina whose particle diameter is smaller than the average pore diameter of the cellular walls and further loading catalytic metal. This exhaust-gas purifying filter catalyst enables to increase the specific surface area of the coating layer as well as to reduce the pressure loss.

Moreover, Japanese Unexamined Patent Publication (KOKAI) No. 09-220423 discloses an exhaust-gas purifying filter catalyst whose cellular wall exhibits a porosity of from 40 to 65% and an average pore diameter of from 5 to 35 μm, and whose coating layer is formed of a porous oxide. In the porous oxide, particles whose particle diameter is less than the average pore diameter of the cellular wall occupy 90% by weight or more. When such a porous oxide with a large specific surface area is coated, it is possible to form the coating layer not only on the surface of the cellular walls but also on the inner surface of the pores. Moreover, when the coating layer is coated in a fixed amount, it is possible to make the thickness of the coating layer thinner. Accordingly, it is possible to inhibit the pressure loss from increasing.

Further, Japanese Unexamined Patent Publication (KOKAI) No. 6-159037 discloses an exhaust-gas purifying filter catalyst whose coating layer is further loaded with a $NO_x$-sorbing member. With the arrangement, $NO_x$ can be sorbed in the $NO_x$-sorbing member. Consequently, when a reducing agent such as light oil is sprayed into the exhaust gas, it is possible to reduce the sorbed $NO_x$ to purify.

When a large amount of PMs are emitted densely at a short time from a diesel engine, etc., PMs are deposited on the surface of the cellular walls or on the inside of the pores, and the pressure loss is increased, since it exceeds the purification capacity of the exhaust-gas purifying filter catalyst. Contrary, when the porosity of the cellular walls is intensified in order to suppress increase of the pressure loss, PMs are let through cellular walls and PM collecting efficiency is lowered.

For instance, with regard to a substrate having the same porosity of 60%, when a substrate has more pores with smaller diameter, the pressure loss is increased, while when a substrate has fewer pores with larger diameter, the collecting efficiency is low.

Moreover, it is conventionally used to avoid this problem to control the distribution of pore diameter, however, since the distribution of pore diameter is measured by a press-fit measuring method such as a mercury porosimeter, the actual distribution of pores is not reflected. Namely, in a press-fit measuring method, the measured value is prescribed by the diameter of the narrowest part of the pores, and thus, it differs from the actual pore diameter, and the accuracy is low. Consequently, even the distribution of pore diameter is designed appropriately by using a press-fit measuring method, it is difficult to avoid the above mentioned problem completely.

SUMMARY OF THE INVENTION

The present invention has been developed in view of such circumstances, and it is directed to securely suppressing increase of the pressure loss as well as securely improving PM collecting efficiency, and it is directed to satisfying both of the above conflicting events.

A substrate for an exhaust-gas purifying filter catalyst of the present invention which solves the above problem, features comprising a catalytic layer formed on the substrate, comprising a honeycomb structure including:
inlet cells clogged on a downstream side of exhaust gases;
outlet cells neighboring the inlet cells and clogged on an upstream side of exhaust gases; and
cellular walls demarcating the inlet cells and the outlet cells and having many pores,
wherein
more than 8% of total opening area of all surface vacancies that the pores are open on the surface of the cellular walls is occupied by total opening area of surface vacancies having maximum diameter of from 10 to 50 μm measured by a direct observation method, and more than 20% of total cross-sectional area of all pores is occupied by total cross-sectional area of pores having cross-sectional area equivalent to that of a circle having diameter more than 300 μm measured by cross-sectional observation using computed tomography (CT) scan.

It is preferable that less than 8% of total opening area of all surface vacancies that the pores are open on the surface of the cellular walls is occupied by total opening area of surface vacancies having maximum diameter of from 100 to 200 μm measured by a direct observation method. In addition, it is preferable that less than 10% of total cross-sectional area of all pores is occupied by total cross-sectional area of pores having cross-sectional area equivalent to that of a circle having diameter less than 100 μm measured by cross-sectional observation using CT scan.

Further, it is preferable that more than 40% of total pore volume of all pores is occupied by total volume of wide pores having the difference between maximum length of pores parallel to cross section and maximum height of pores vertical to cross section more than 10 μm measured by cross-sectional observation using CT scan. It is also preferable that less than 10% of total pore volume of all pores is occupied by total volume of pores having the difference between maximum length of pores parallel to cross section and maximum height of pores vertical to cross section less than 10 μm measured by cross-sectional observation using CT scan.

DETAILED DESCRIPTION OF THE PREFERRED EMBODIMENTS

Figure 1:
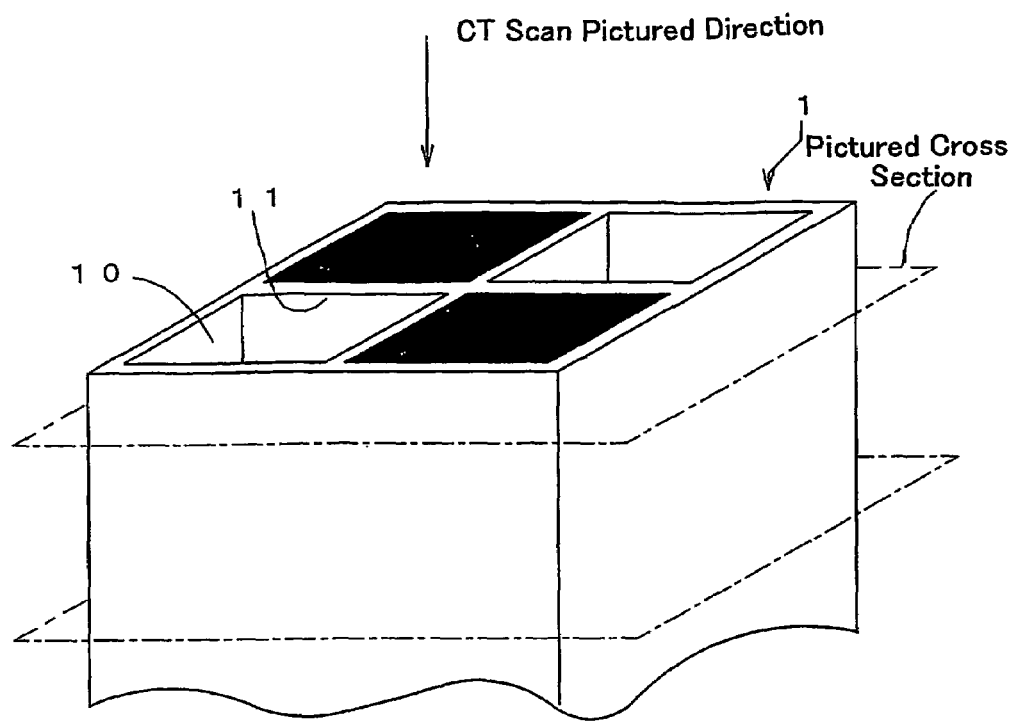
FIG. 1 is an explanatory drawing showing the conditions of CT scan according to an example of the present invention.

Cellular walls of a substrate for an exhaust-gas purifying filter catalyst have many pores. In the present invention, the pores which open to the surface of cellular walls, are called as surface vacancies, and the pores which exist in cellular walls as inner pores.

With regard to a substrate for exhaust-gas purifying filter catalyst of the present invention, more than 8% of total opening area of all surface vacancies that the pores are open on the surface of the cellular walls is occupied by total opening area of surface vacancies having maximum diameter of from 10 to 50 μm measured by a direct observation method. Such distribution of surface openings enables PMs to disperse all over the surface of the cellular walls without entering the inside of cellular walls from particular openings. PMs flow from many openings towards the inside of cellular walls, adhere to pores sequentially and are burned by a catalytic layer.

Thus, even when a large amount of PMs are emitted densely at a short time, since they are dispersed and collected by each pore, deficiency of exceeding purification capacity of a catalyst can be avoided and a high level of PM purification capacity can be realized. Also, since PM deposition is controlled, increase of the pressure loss can be suppressed. Moreover, since the probability of PMs contacting catalytic layer is improved, PM collecting efficiency can also be improved by burning.

In accordance with a substrate for an exhaust-gas purifying filter catalyst of the present invention, more than 20% of total cross-sectional area of all pores is occupied by total cross-sectional area of pores having cross-sectional area equivalent to that of a circle having diameter more than 300 μm measured by cross-sectional observation using computed tomography (CT) scan. Owing to this construction, PM clogging in the inside of pores can be avoided and increase of the pressure loss can be further suppressed.

It is preferable that less than 8% of total opening area of all surface vacancies that the pores are open on the surface of the cellular walls is occupied by total opening area of surface vacancies having maximum diameter of from 100 to 200 μm measured by a direct observation method, or alternatively, it is preferable that less than 10% of total pore volume of all pores is occupied by total volume of pores having the difference between maximum length of pores parallel to cross section and maximum height of pores vertical to cross section less than 10 μm measured by cross-sectional observation using CT scan. According to this construction, collecting efficiency cannot be affected but increase of the pressure loss can be further suppressed.

Further, when more than 40% of total pore volume of all pores is occupied by total volume of wide pores having the difference between maximum length of pores parallel to cross section and maximum height of pores vertical to cross section more than 10 μm measured by cross-sectional observation using CT scan, PM escaping can be controlled effectively and PM collecting efficiency can be further improved.

Consequently, in accordance with an exhaust-gas purifying filter catalyst using a substrate of the present invention, collecting efficiency can be improved, as well as increase of the pressure loss can be suppressed, since PMs efficiently adhere to the surface of the cellular walls and the inside of pores, move and burn.

A substrate comprises inlet cells clogged on the downstream side of exhaust gases, outlet cells neighboring the inlet cells and clogged on the upstream side of the exhaust gases, and filter cellular walls demarcating the inlet cells and the outlet cells.

This substrate can be made from heat resisting ceramics such as cordierite. For instance, prepare a clay-state slurry which mainly consists of a cordierite powder, form it by such as extrusion molding and burn it. Instead of a cordierite powder, a powder of alumina, magnesia and silica can be used to make the cordierite composition. Then, clog the cellular openings on one end surface such as in a checkered manner by a similar clay-state slurry, etc., and on the other end surface, clog the cellular openings of cells which are neighboring the clogged cells on the opposite end surface. After that, fix the clogging material by such as burning, and the substrate can be manufactured.

To form pores in cellular walls of the substrate, mix for instance, a combustible powder such as carbon powders, wood powders, starch powders and resin powders into the above mentioned slurry, the combustible powder disappears in burning and pores can be formed. The diameter distribution of the surface vacancies and the inner pores, and the opening area can be controlled by adjusting particle diameter and an addition amount of the combustible powder.

Measurement of the distribution of the surface vacancies which opens on the surface of cellular walls, should be conducted by a direct observation using a microscope, etc. By a press-fit measuring method using a mercury porosimeter, etc. it is difficult to measure the actual distribution of the surface vacancies.

When less than 8% of total opening area of all surface vacancies that the pores are open on the surface of the cellular walls is occupied by total opening area of surface vacancies having maximum diameter of from 10 to 50 μm, PMs which enter the inside of the surface vacancies decrease and deposit on the surface of cellular walls, which leads to increase of the pressure loss. Moreover, when over 8% of total opening area of all surface vacancies that the pores are open on the surface of the cellular walls is occupied by total opening area of surface vacancies having maximum diameter of from 100 to 200 μm, PMs tend to coagulate and deposit especially at those openings, which results in increase of the pressure loss.

In addition, the distribution of inner pore diameter is measured by a cross-sectional observation using CT scan. This enables to measure the actual inner shapes of pores. Herein cross-section refers to the cross-section of cellular walls, and it is not restricted to the parallel cross-section which cells of the substrate stretch or the vertical cross-section. It is preferable to conduct a cross-sectional observation at several positions and adopt its average.

With regard to the distribution of inner pore diameter, since cross-sectional shapes of the inner pores vary in many way, it is to be estimated by the diameter of a circle having the area equivalent to the cross-sectional area of the inner pores. In cross-section, when less than 20% of total cross-sectional area of all pores is occupied by total cross-sectional area of pores having cross-sectional area equivalent to that of a circle having diameter more than 300 μm, PMs tend to deposit and clog in the inner pores and the pressure loss increases. Also, when over 10% of total cross-sectional area of all pores is occupied by total cross-sectional area of pores having cross-sectional area equivalent to that of a circle having diameter less than 100 μm, PMs similarly tend to deposit and clog in the inner pores and the pressure loss increases.

Further, when less than 40% of total pore volume of all pores is occupied by total volume of wide pores having the difference between maximum length of pores parallel to cross section and maximum height of pores vertical to cross section more than 10 μm measured by cross-sectional observation using CT scan, PMs tend to escape and PM collecting efficiency deteriorates.

It is preferable that the porosity of cellular walls falls between 60% and 80%. With the porosity in this range, increase of the pressure loss can be suppressed and decrease of strength can also be suppressed even with forming the catalytic layer in an amount of from 100 to 200 g/L.

The catalytic layer which loads precious metals in oxide support is formed on the surface of cellular walls and on the inner surface of the pores. As for the oxide support, it is possible to use the oxide such as $Al_2O_3$ $ZrO_2$, $CeO_2$, $TiO_2$ and $SiO_2$ or a composite oxide comprising a plurality of these oxides. As for the precious metal, it is possible to use precious metals which enable $NO_x$ reduction by catalytic reaction and also promote PM oxidation, however, it is preferable to use one or more members selected from platinum-group precious metals such as Pt, Rh, Pd, Ir and Ru, etc. The loading amount of the precious metal can preferably fall in a range of from 1 to 5 g with respect to 1 L of the substrate. When the loading amount is less than 1 g, the activities are too low to be practical, while when the loading amount is more than 10 g, the activities become saturated and it results in cost pushing.

As for the catalytic layer, it is preferable to comprise $NO_x$-sorbing member selected from the group consisting of alkali metals, alkaline-earth metals and rare-earth elements. When the catalytic layer comprises $NO_x$-sorbing member, $NO_x$ purifying activities can be further improved since $NO_x$-sorbing member can absorb $NO_2$ produced in oxidation by precious metals. As for the $NO_x$-sorbing member, it is possible to use one member selected from the group consisting of alkali metals such as K, Na, Cs and Li, alkaline-earth metals such as Ba, Ca, Mg and Sr or rare-earth elements such as Sc, Y, Pr and Nd. Among them, it is desirable to use at least one member selected from the group consisting of alkali metals and alkaline-earth metals which have high $NO_x$-sorbing ability.

The loading amount of the $NO_x$-sorbing member can preferably fall in a range of from 0.15 to 0.45 mol with respect to 1 L of the substrate. When the loading amount is less than 0.15 mol, the purifying activities are too less to be practical, while when the $NO_x$-sorbing member is loaded more than 0.45 mol, the precious metals are covered to degrade the activities.

To form the catalytic layer, an oxide powder or a composite oxide powder is made into a slurry together with a binder component, such as an alumina sol, and water. The resulting slurry is deposited on the cellular walls, calcined, and thereafter loaded the precious metals. Alternatively, a slurry can be prepared with the catalytic powder which the precious metal is loaded on an oxide powder or a composite oxide powder in advance. To deposit the slurry on the cellular walls, it is possible to use ordinary immersion methods, however, it is desirable, by air-blowing or suction, to compulsorily fill the pores of the cellular walls with the slurry as well as to remove the excess slurry which enters the pores.

It is preferable to coat the catalytic layer in an amount of from 100 to 200 g with respect to 1 L of the substrate. When the catalytic layer is coated in an amount of less than 100 g/L, it is inevitable that the durability of the $NO_x$-sorbing member and the precious metal deteriorates, while when over 200 g/L, the pressure loss becomes too high to be practical.

Namely, in accordance with the substrate for exhaust-gas purifying filter catalyst of the present invention, when used as an exhaust-gas purifying filter catalyst to form a catalytic layer, it is possible to securely suppress the increase of pressure loss as well as to securely improve PM collecting efficiency. Also, it is possible to suppress the influence on the engines due to the increase of pressure loss, as well as to purify PMs efficiently.

EXAMPLES

Hereinafter described in more detail with reference to the specific embodiments.

Several kinds of straight honeycomb-shaped substrate made of cordierite were prepared. The substrates had a diameter of 129 mm, a length of 150 mm and a volume of about 2,000 cc, and comprised square-shaped cells in a quantity of 300 cells/inch$^2$.

Next, a powder was prepared which comprised alumina, talc, kaoline and silica to make the cordierite composition. The powder was mixed with predetermined amounts of an organic binder and water to prepare a creamy paste with stable shape-retaining property. With the resulting paste, upstream plugs were formed alternately by a paste injector (or a dispenser) which has a pipe with predetermined length, to clog every other cell at an inner position with respect to the upstream-side end surface of each substrate. Meanwhile, at the downstream-side end surface of the substrate, downstream plugs were formed to clog the cells which were not plugged by the upstream plugs. The substrate was thereafter calcined at 1,400° C. and thus, several kinds of substrate which have the inlet cells and the outlet cells, were formed.

By observing the surface of the cellular walls of these substrates with a microscope, the maximum diameter and the area of each surface vacancies which open on the surface were measured. Then the rate of total opening area of the surface vacancies having maximum diameter of in a certain range, to the total opening area of all surface vacancies was measured. Also, as shown in FIG. 1, with CT scan, by picturing the cross-section vertical to the direction which cell 10 of substrate 1 stretches, the distribution of inner pore diameter was measured on the cross-section of cellular wall 11. As to the inner pore diameter, the cross-sectional area of each inner pores was measured on each cross-section pictured by CT scan. Then, the rate of the total cross-sectional area of the openings whose diameter falls in a certain range, to the total cross-sectional area of all pores, was measured by adopting the diameter of the circle having the area of equivalent to its cross-sectional area. The cross-section places were scanned at several positions by CT scan, and each average points were estimated.

Figure 2:
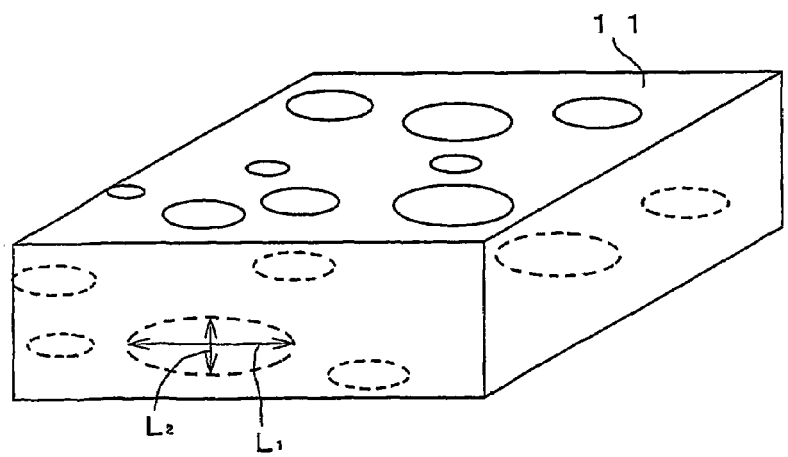
FIG. 2 is an explanatory drawing showing the inner pores of the cellular walls according to an example of the present invention.
Figure 3:
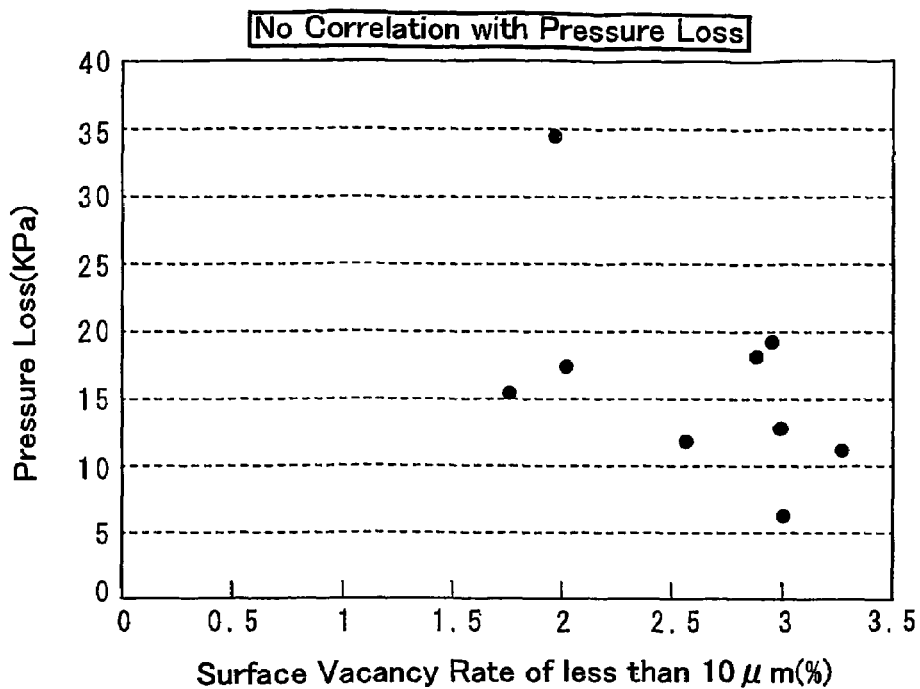
FIG. 3 is a correlation diagram showing the relation between the rate of surface vacancies which is less than 10 μm and the pressure loss.
Figure 4:
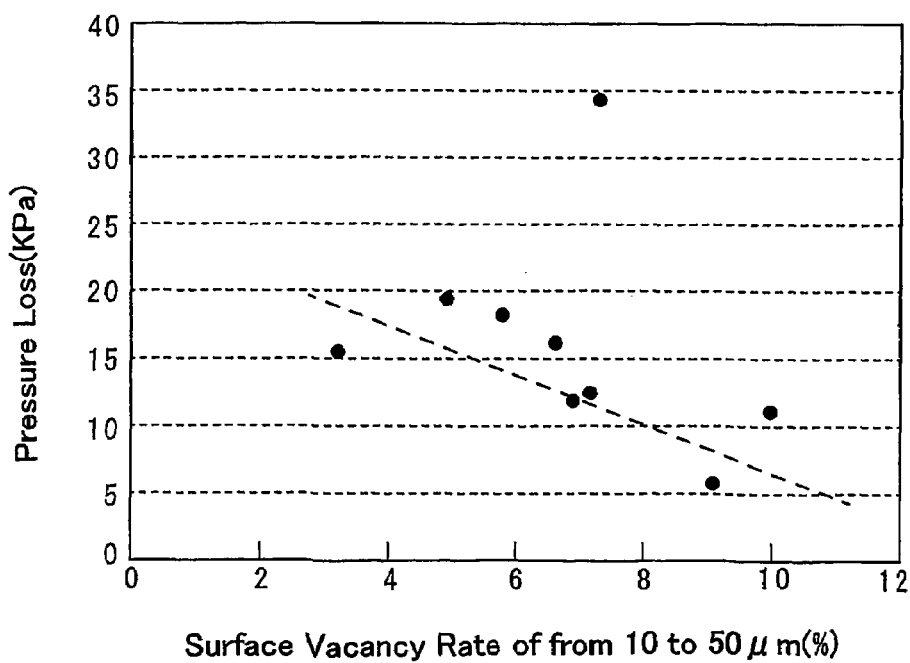
FIG. 4 is a correlation diagram showing the relation between the rate of surface vacancies which is from 10 to 50 μm and the pressure loss.
Figure 5:
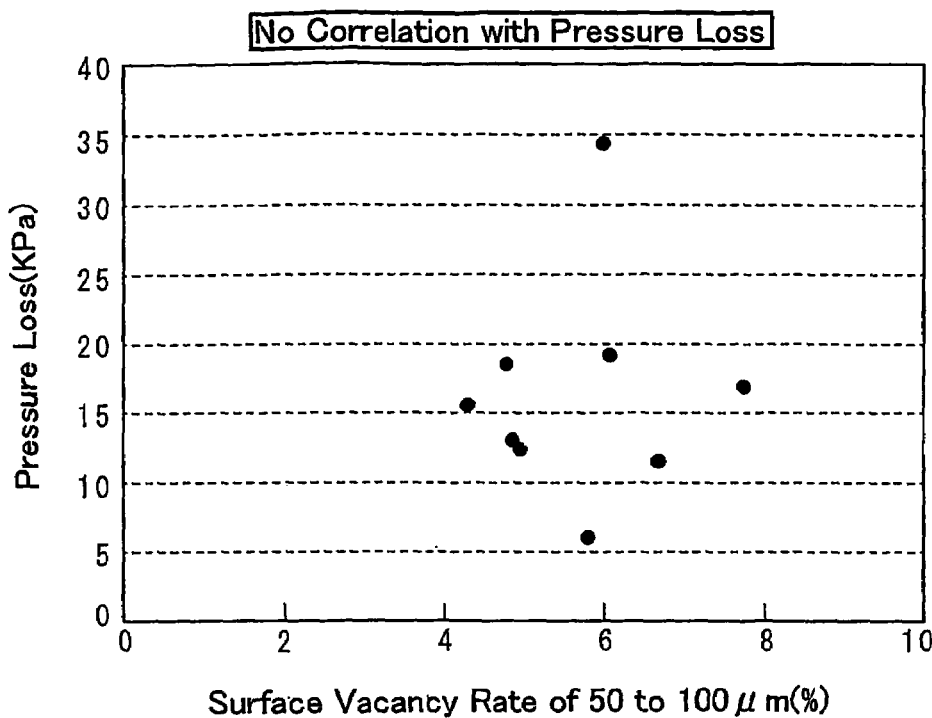
FIG. 5 is a correlation diagram showing the relation between the rate of surface vacancies which is from 50 to 100 μm and the pressure loss.
Figure 6:
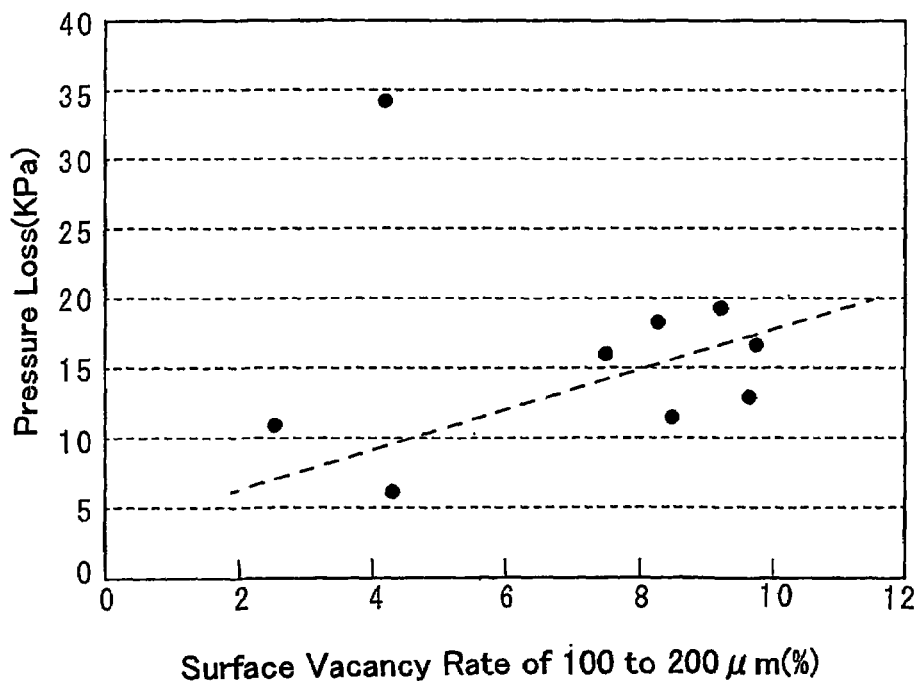
FIG. 6 is a correlation diagram showing the relation between the rate of surface vacancies which is from 100 to 200 μm and the pressure loss.
Figure 7:
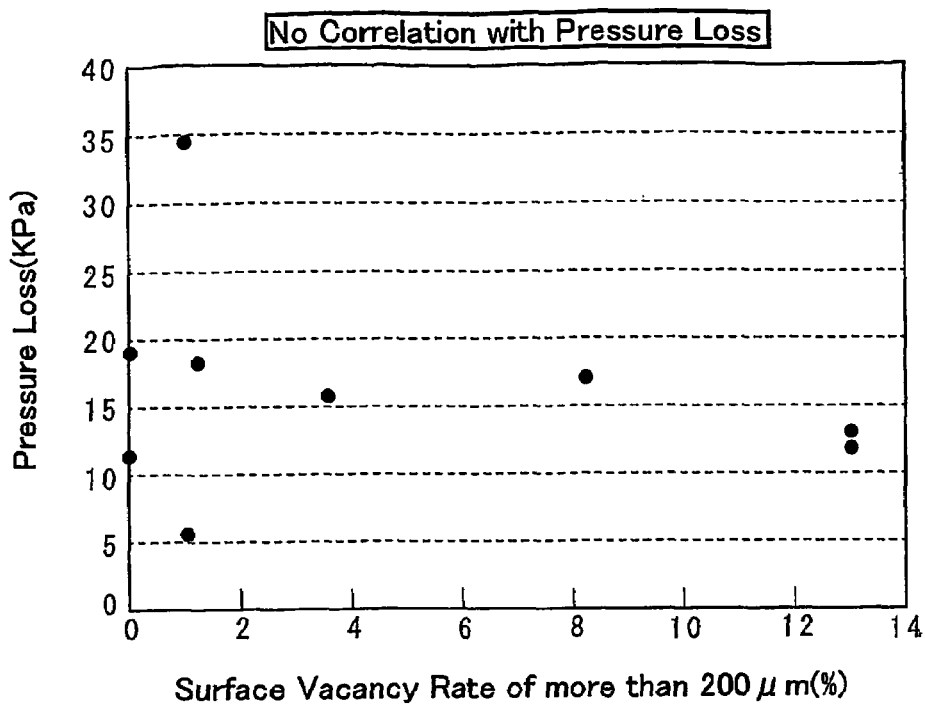
FIG. 7 is a correlation diagram showing the relation between the rate of surface vacancies which is more than 200 μm and the pressure loss.
Figure 8:
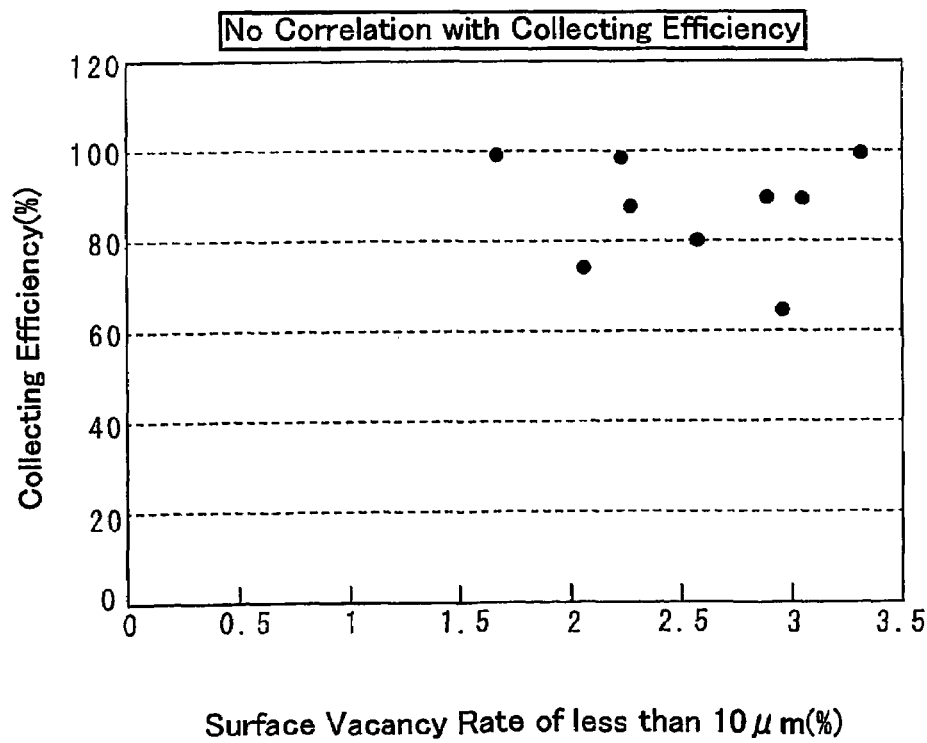
FIG. 8 is a correlation diagram showing the relation between the rate of surface vacancies which is less than 10 μm and the collecting efficiency.
Figure 9:
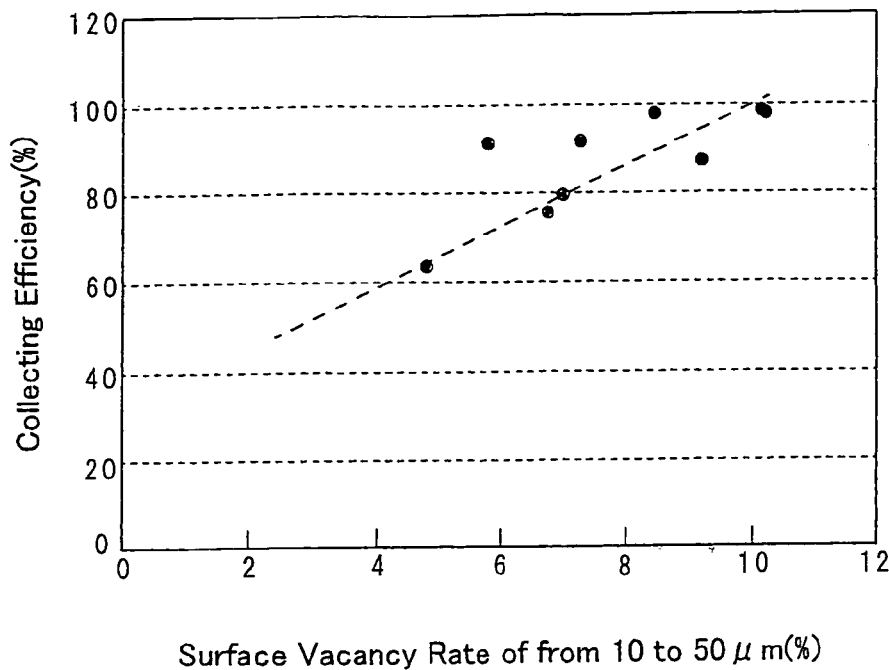
FIG. 9 is a correlation diagram showing the relation between the rate of surface vacancies which is from 10 to 50 μm and the collecting efficiency.
Figure 10:
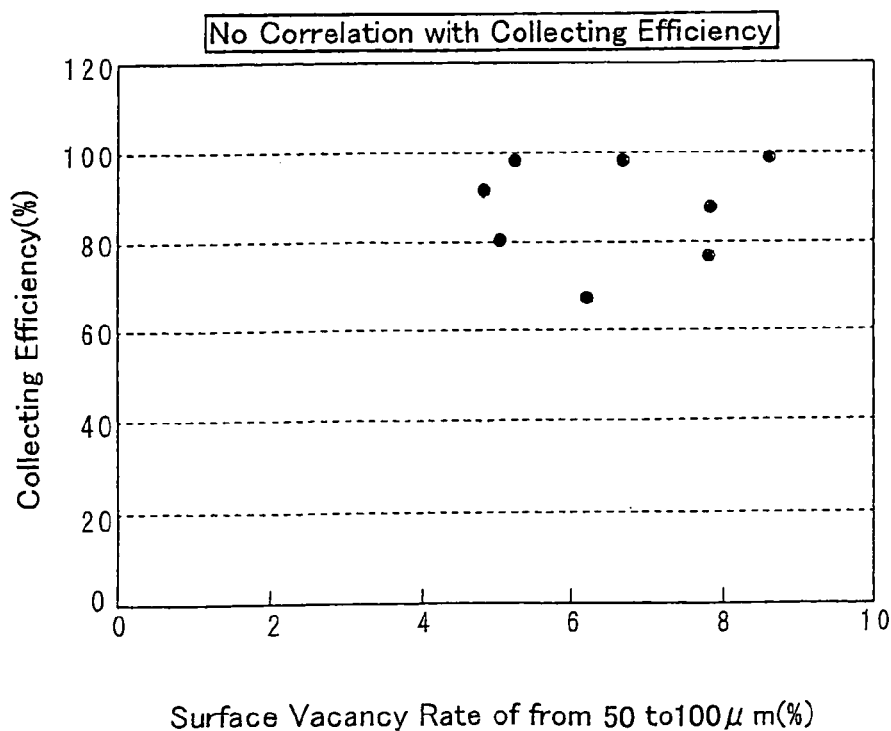
FIG. 10 is a correlation diagram showing the relation between the rate of surface vacancies which is from 50 to 100 μm and the collecting efficiency.
Figure 11:
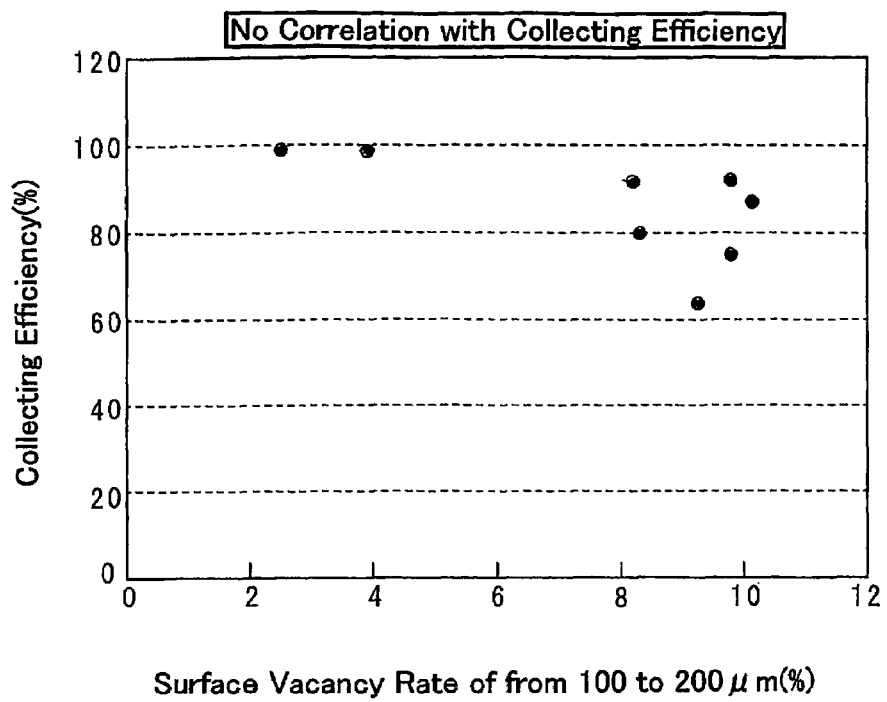
FIG. 11 is a correlation diagram showing the relation between the rate of surface vacancies which is from 100 to 200 μm and the collecting efficiency.
Figure 12:
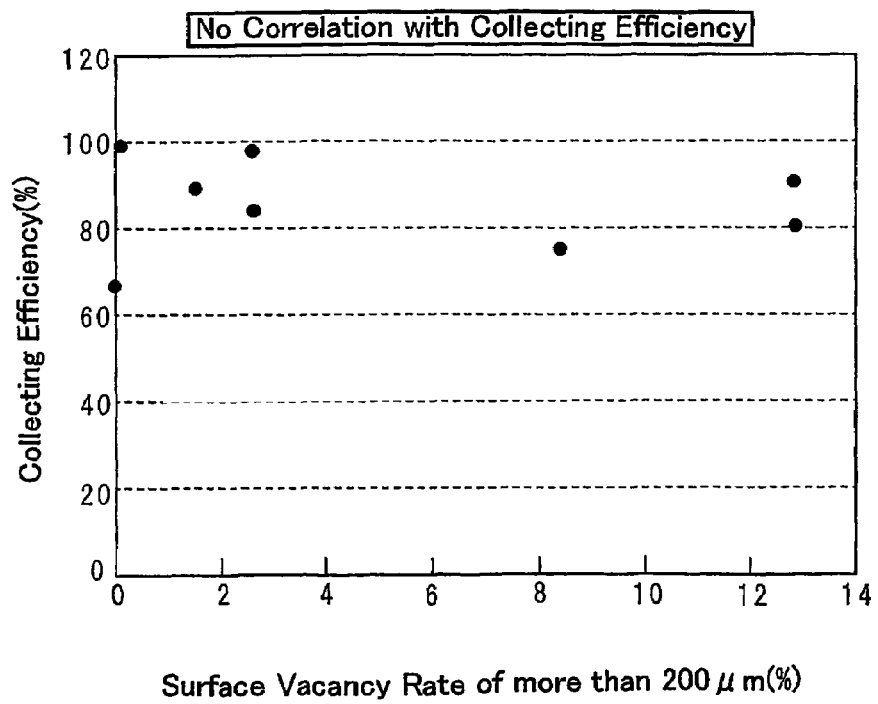
FIG. 12 is a correlation diagram showing the relation between the rate of surface vacancies which is more than 200 μm and the collecting efficiency.
Figure 13:
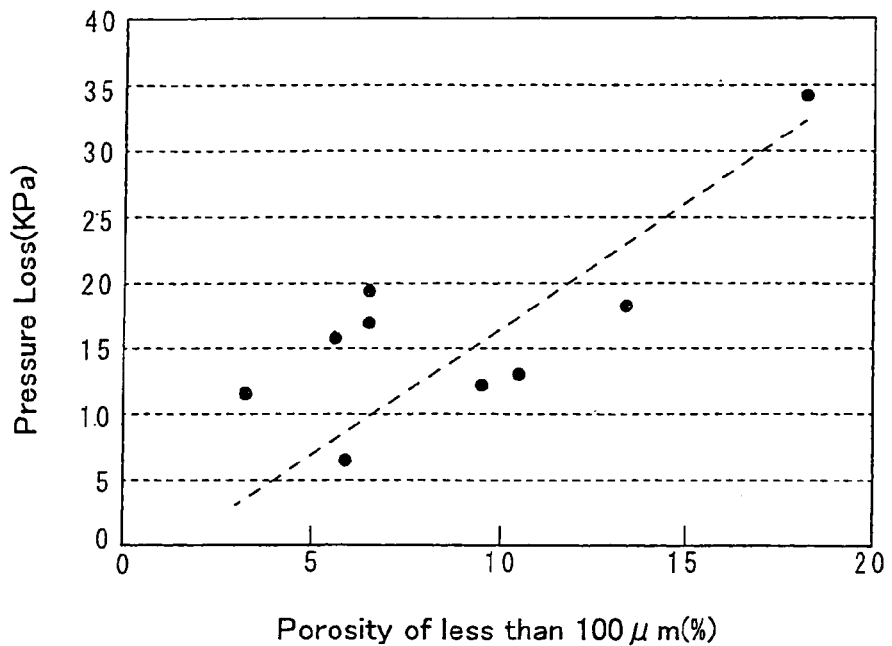
FIG. 13 is a correlation diagram showing the relation between the rate of the inner pores which is less than 100 μm and the pressure loss.
Figure 14:
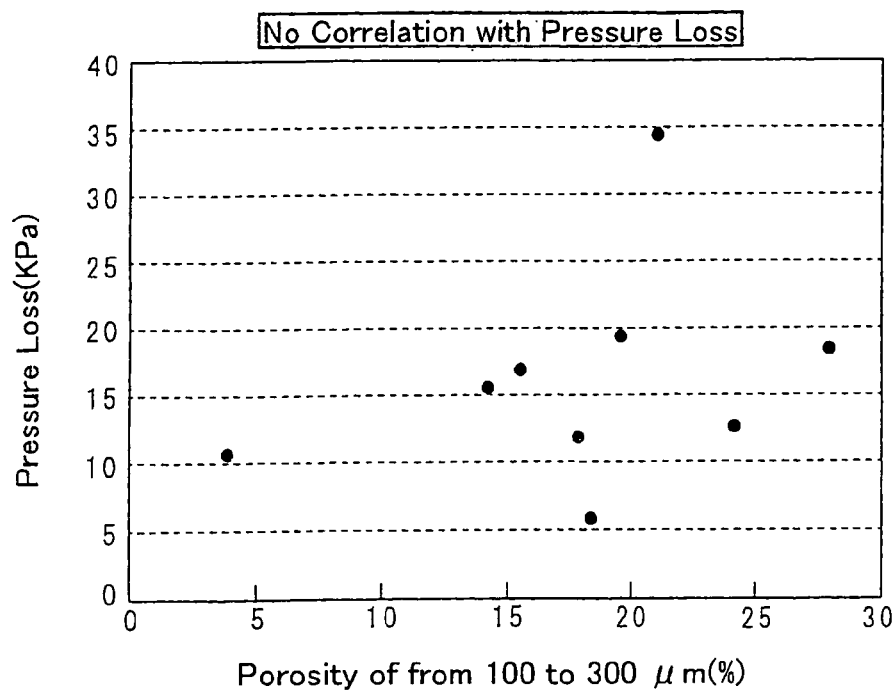
FIG. 14 is a correlation diagram showing the relation between the rate of the inner pores which is from 100 to 300 μm and the pressure loss.
Figure 15:
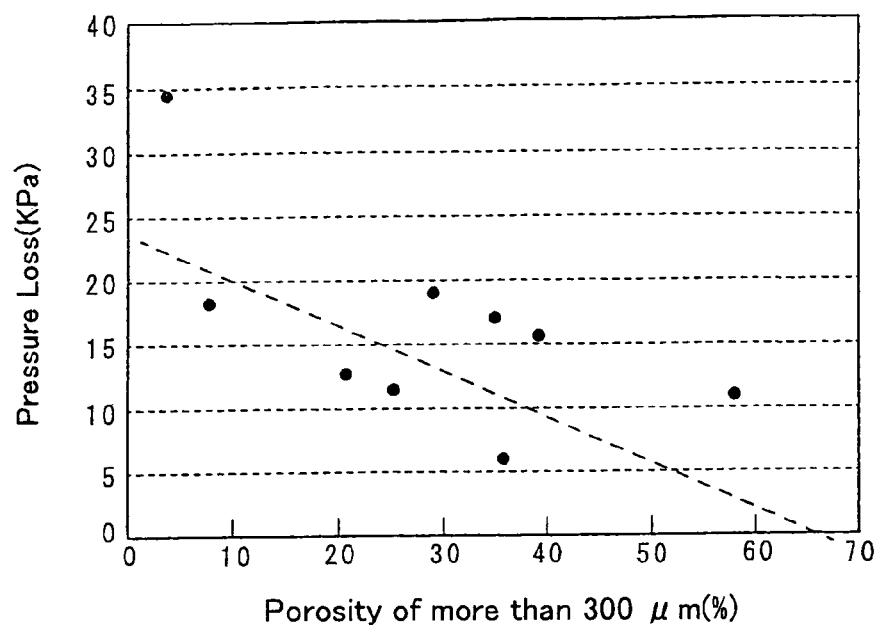
FIG. 15 is a correlation diagram showing the relation between the rate of the inner pores which is more than 300 μm and the pressure loss.
Figure 16:
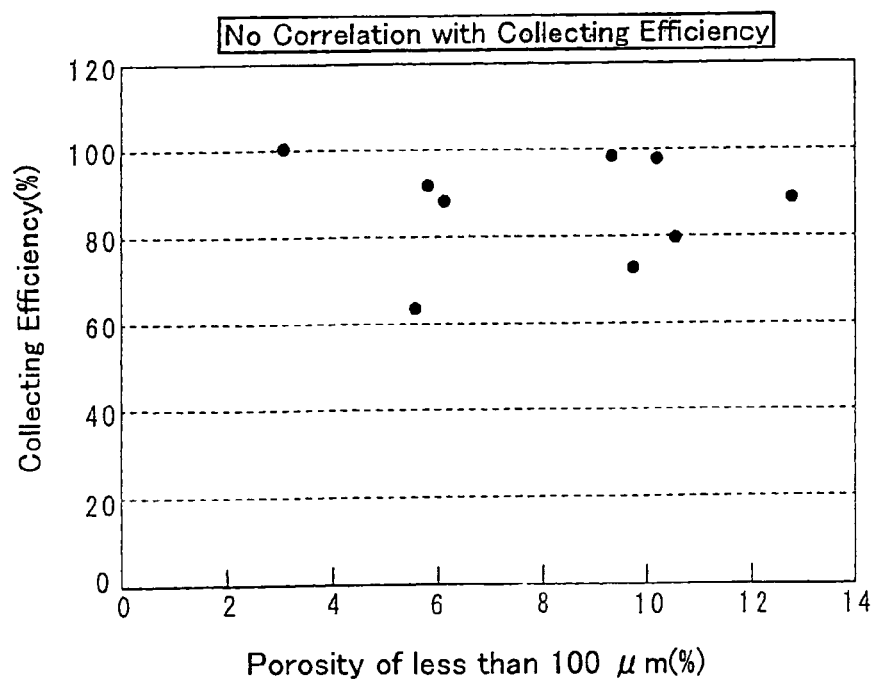
FIG. 16 is a correlation diagram showing the relation between the rate of the inner pores which is less than 100 μm and the collecting efficiency.
Figure 17:
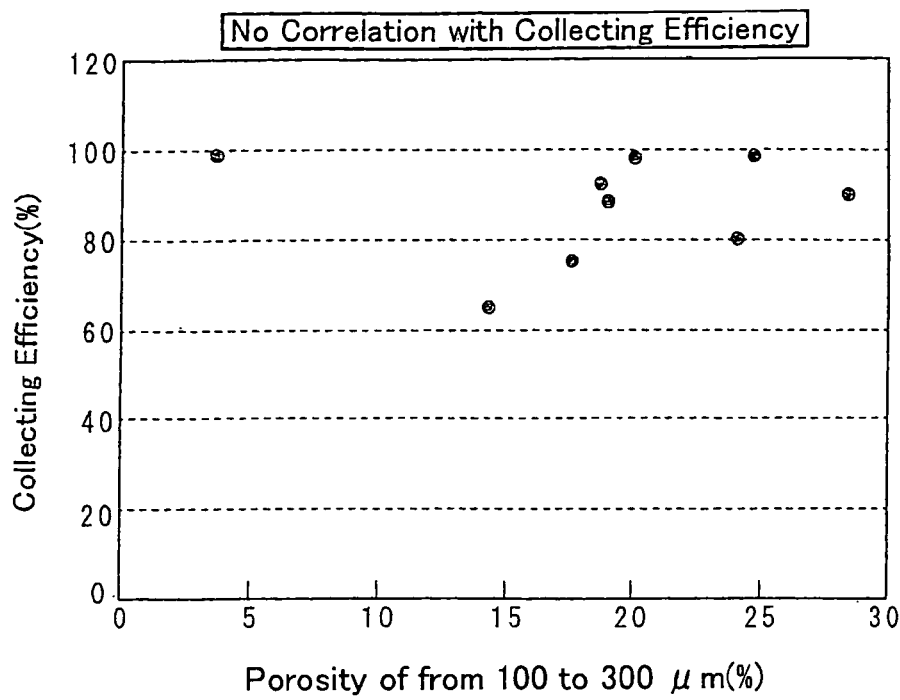
FIG. 17 is a correlation diagram showing the relation between the rate of the inner pores which is from 100 to 300 μm and the collecting efficiency.
Figure 18:
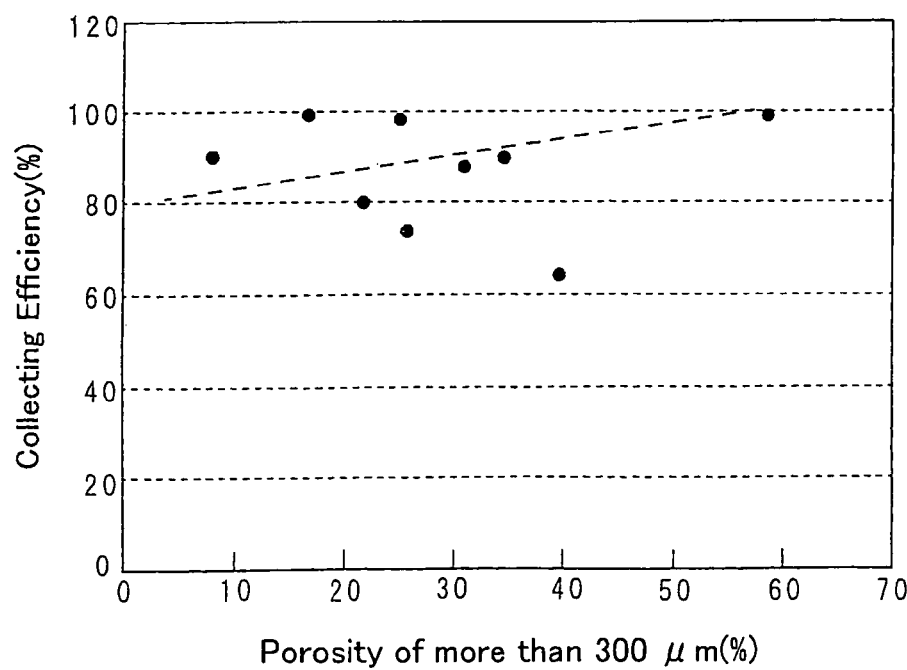
FIG. 18 is a correlation diagram showing the relation between the rate of the inner pores which is more than 300 μm and the collecting efficiency.
Figure 19:
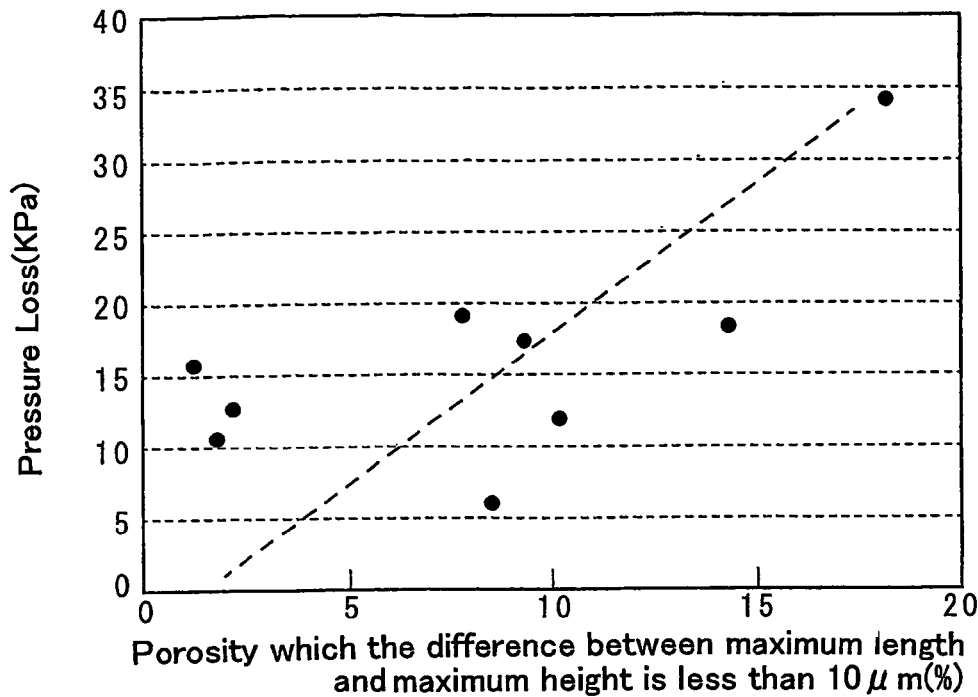
FIG. 19 is a correlation diagram showing the relation between the rate of the inner pores having maximum difference in length and height is less than 10 μm, and the pressure loss.
Figure 20:
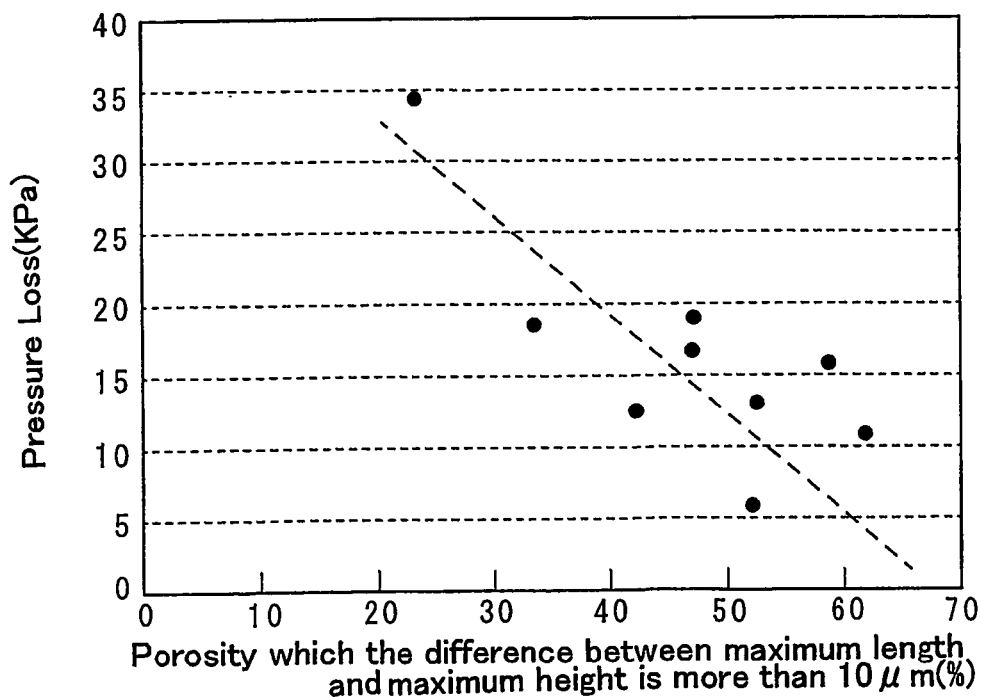
FIG. 20 is a correlation diagram showing the relation between the rate of the inner pores having maximum difference in length and height is more than 10 μm, and the pressure loss.
Figure 21:
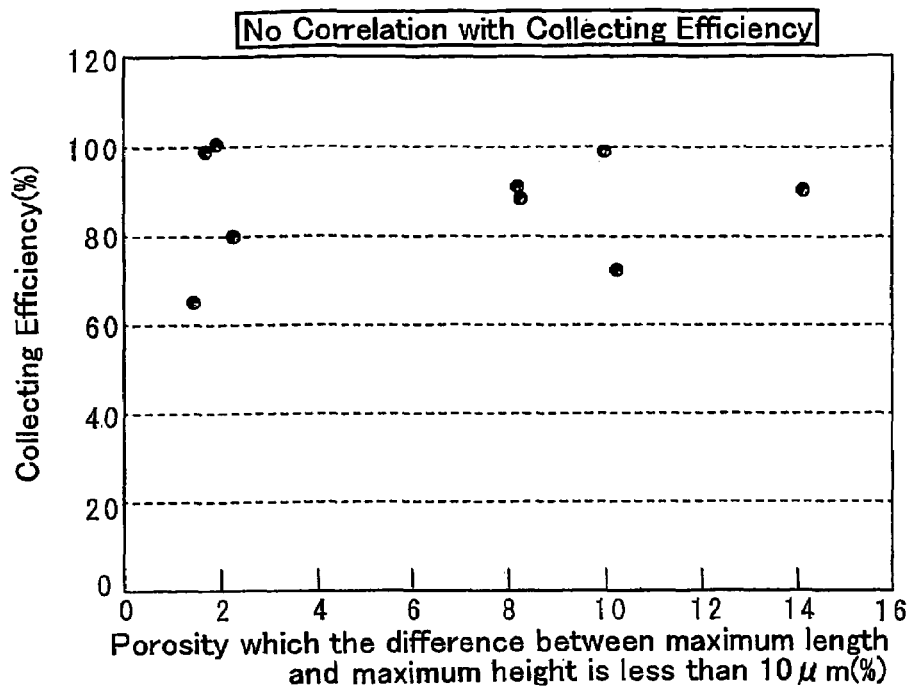
FIG. 21 is a correlation diagram showing the relation between the rate of the inner pores having maximum difference in length and height is less than 10 μm, and the collecting efficiency.
Figure 22:
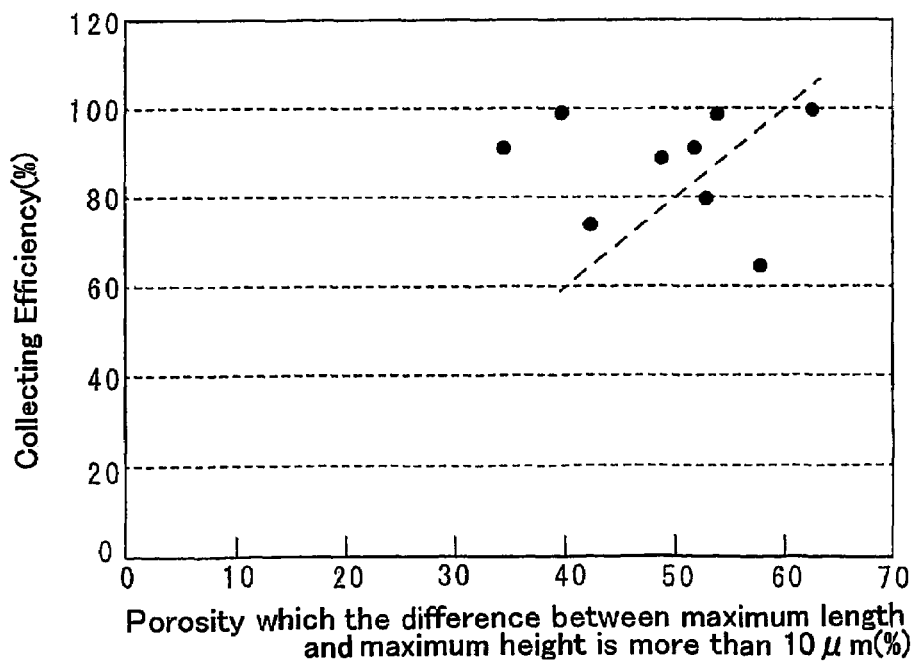
FIG. 22 is a correlation diagram showing the relation between the rate of the inner pores having maximum difference in length and height is more than 10 μm, and the collecting efficiency.

Further, in a cross-sectional observation by CT scan, as shown in FIG. 2, the distribution of differences ($L_1$–$L_2$) between maximum length $L_1$ of pores parallel to the cross-section and maximum height $L_2$ of pores vertical to the cross-section was measured. Then, the rate of the total volume of pores whose differences fall in each range, to the total volume of all pores, was measured.

Next, with each substrate used above, the slurry which mainly comprises an alumina powder whose average particle diameter is from 0.5 to 1.0 μm, was wash coated, dried at 110° C., and thereafter calcined at 450° C., thereby forming a coating layer, respectively. Then, it was made to absorb the predetermined amount of dinitrodianmine platinum aqueous solution of predetermined concentration, dried at 110° C., and calcined at 450° C., thereby loading Pt on the coating layer to form the catalytic layer. Pt was loaded in an amount of 5 g per 1 L of the substrate, respectively, and the catalytic layer was formed in an amount of 150 g per 1 L of the substrate, respectively.

The resulting exhaust-gas purifying filter catalyst was installed to an exhaust system of 2 L diesel engines, respectively, and circulating an exhaust-gas of 1600 rpm×30 Nm, incoming gas temperature at 200° C., the pressure loss was measured, respectively, at the point which PM was deposited in an amount of 3 g per 1 L of each substrate. Moreover, PM collecting efficiency was continuously measured from PM amount in the incoming gas and the outgoing gas, and the maximum amount was calculated, respectively, to obtain saturation collecting efficiency.

The results of the above examination are shown in FIG. 3 to FIG. 22.

<Estimate>

FIG. 3 to FIG. 12 illustrate regarding surface vacancies and FIG. 13 to FIG. 22 illustrate regarding inner pores.

As shown in FIG. 3 to FIG. 7, there are correlations between the surface vacancy rate of from 10 to 50 μm and from 100 to 200 μm, and the pressure loss. As shown in FIG. 8 to FIG. 12, there are also correlations between the vacancy rate of from 10 to 50 μm and the collecting efficiency. Further, when more than 8% of total opening area of all surface vacancies that the pores are open on the surface of the cellular walls is occupied by total opening area of surface vacancies having maximum diameter of from 10 to 50 μm, the pressure loss can be suppressed at less than approximately 10 KPa, as well as the collecting efficiency can be more than approximately 90%. Additionally, the surface vacancy rate of from 100 to 200 μm does not influence the collecting efficiency, however, when it is more than 8%, the pressure loss is increased, while when it is less than 8%, the pressure loss can be suppressed at approximately less than 15 KPa.

Moreover, as shown in FIG. 13 to 18, there are also correlations between the distribution of inner pores, and the pressure loss and collecting efficiency. When the rate of the pores which have the cross-sectional area equivalent to that of a circle having diameter more than 300 μm lowers, the pressure loss is increased and collecting efficiency is deteriorated. Thus, when more than 20% of total cross-sectional area of all pores is occupied by total cross-sectional area of pores having cross-sectional area equivalent to that of a circle having diameter more than 300 μm, the pressure loss can be suppressed at about less than 15 KPa as well as the collecting efficiency can be more than about 90%. Additionally, total cross-sectional area of pores having cross-sectional area equivalent to that of a circle having diameter less than 100 μm, does not influence the collecting efficiency, however, the higher it becomes, the more the pressure loss increases, it is understood that it is preferably less than 10% of total cross-sectional area of all pores.

Further, from FIG. 19 to 22, it is understood that the pressure loss can be suppressed at approximately less than 15 KPa, when less than 10% of total pore volume of all pores is occupied by total volume of pores having the difference ($L_1 - L_2$) between maximum length ($L_1$) of pores parallel to cross section and maximum height ($L_2$) of pores vertical to cross section less than 10 μm, and when the rate of the volume of the pores having the difference more than 10 μm is high. It is also understood that the pores having the difference less than 10 μm do not influence the collecting efficiency and that the wide pores having the difference more than 10 μm contribute to the collecting efficiency.

The invention claimed is:

1. A substrate for an exhaust-gas purifying filter catalyst comprising a catalytic layer formed on the substrate, comprising
   a honeycomb structure including:
   inlet cells clogged on a downstream side of exhaust gases;
   outlet cells neighboring the inlet cells and clogged on an upstream side of exhaust gases; and
   cellular walls demarcating the inlet cells and the outlet cells and having pores,
   wherein
   more than 8% of total opening area of all surface vacancies that the pores are open on the surface of the cellular walls is occupied by total opening area of surface vacancies having maximum diameter of from 10 to 50 μm measured by a direct observation method, and
   more than 20% of total cross-sectional area of all pores is occupied by total cross-sectional area of pores having cross-sectional area equivalent to that of a circle having diameter more than 300 μm measured by cross-sectional observation using computed tomography (CT) scan.

2. The substrate for an exhaust-gas purifying filter catalyst set forth in claim 1, wherein less than 8% of total opening area of all surface vacancies that the pores are open on the surface of the cellular walls is occupied by total opening area of surface vacancies having maximum diameter of from 100 to 200 μm measured by a direct observation method.

3. The substrate for an exhaust-gas purifying filter catalyst set forth in claim 1, wherein less than 10% of total cross-sectional area of all pores is occupied by total cross-sectional area of pores having cross-sectional area equivalent to that of a circle having diameter less than 100 μm measured by cross-sectional observation using CT scan.

4. The substrate for an exhaust-gas purifying filter catalyst set forth in claim 1, wherein more than 40% of total pore volume of all pores is occupied by total volume of wide pores having the difference between maximum length of pores parallel to cross section and maximum height of pores vertical to cross section more than 10 μm measured by cross-sectional observation using CT scan.

5. The substrate for an exhaust-gas purifying filter catalyst set forth in claim 1, wherein less than 10% of total pore volume of all pores is occupied by total volume of pores having the difference between maximum length of pores parallel to cross section and maximum height of pores vertical to cross section less than 10 μm measured by cross-sectional observation using CT scan.

6. A catalyst for purifying exhaust gases, comprising the substrate set forth in claim 1, and a catalytic layer comprising precious metal and oxide support, wherein the catalytic layer is formed on the substrate.

7. The catalyst for purifying exhaust gases set forth in claim 6, further comprising $NO_x$-sorbing member selected from the group consisting of alkali metals, alkaline-earth metals and rare-earth elements in said catalytic layer.

8. The substrate for an exhaust-gas purifying filter catalyst set forth in claim 2, wherein less than 10% of total cross-sectional area of all pores is occupied by total cross-sectional area of pores having cross-sectional area equivalent to that of a circle having diameter less than 100 μm measured by cross-sectional observation using CT scan.

9. The substrate for an exhaust-gas purifying filter catalyst set forth in claim 2, wherein more than 40% of total pore volume of all pores is occupied by total volume of wide pores having the difference between maximum length of pores parallel to cross section and maximum height of pores vertical to cross section more than 10 μm measured by cross-sectional observation using CT scan.

10. The substrate for an exhaust-gas purifying filter catalyst set forth in claim 3, wherein more than 40% of total pore volume of all pores is occupied by total volume of wide pores having the difference between maximum length of pores parallel to cross section and maximum height of pores vertical to cross section more than 10 μm measured by cross-sectional observation using CT scan.

11. The substrate for an exhaust-gas purifying filter catalyst set forth in claim 2, wherein less than 10% of total pore volume of all pores is occupied by total volume of pores having the difference between maximum length of pores parallel to cross section and maximum height of pores vertical to cross section less than 10 μm measured by cross-sectional observation using CT scan.

12. The substrate for an exhaust-gas purifying filter catalyst set forth in claim 3, wherein less than 10% of total pore volume of all pores is occupied by total volume of pores having the difference between maximum length of pores parallel to cross section and maximum height of pores vertical to cross section less than 10 μm measured by cross-sectional observation using CT scan.

13. The substrate for an exhaust-gas purifying filter catalyst set forth in claim 4, wherein less than 10% of total pore volume of all pores is occupied by total volume of pores having the difference between maximum length of pores parallel to cross section and maximum height of pores vertical to cross section less than 10 μm measured by cross-sectional observation using CT scan.

14. A catalyst for purifying exhaust gases, comprising the substrate set forth in claim 2, and a catalytic layer comprising precious metal and oxide support, wherein the catalytic layer is formed on the substrate.

15. A catalyst for purifying exhaust gases, comprising the substrate set forth in claim 3, and a catalytic layer comprising precious metal and oxide support, wherein the catalytic layer is formed on the substrate.

16. A catalyst for purifying exhaust gases, comprising the substrate set forth in claim 4, and a catalytic layer comprising precious metal and oxide support, wherein the catalytic layer is formed on the substrate.

17. A catalyst for purifying exhaust gases, comprising the substrate set forth in claim 5, and a catalytic layer comprising precious metal and oxide support, wherein the catalytic layer is formed on the substrate.

* * * * *